(12) United States Patent
Saiu et al.

(10) Patent No.: US 8,412,599 B2
(45) Date of Patent: Apr. 2, 2013

(54) APPROVAL WORKFLOW ENGINE FOR SERVICES PROCUREMENT TIMESHEETS, PROGRESS LOGS, AND EXPENSES

(75) Inventors: Joanne Saiu, San Jose, CA (US); Shanti Muppirala, San Jose, CA (US); Atul Shah, San Ramon, CA (US); Lorna Christensen, San Ramon, CA (US); Tamijselvy Muralidharan, Cupertino, CA (US); Bobby Chacko, Karnataka (IN); Pradeep Govindappa, Karnataka (IN); Shawn Abernathy, Boulder Creek, CA (US)

(73) Assignee: Oracle International Corporation, Redwood Shores, CA (US)

( * ) Notice: Subject to any disclaimer, the term of this patent is extended or adjusted under 35 U.S.C. 154(b) by 37 days.

(21) Appl. No.: 12/872,253

(22) Filed: Aug. 31, 2010

(65) Prior Publication Data
US 2011/0191217 A1     Aug. 4, 2011

Related U.S. Application Data

(60) Provisional application No. 61/300,940, filed on Feb. 3, 2010.

(51) Int. Cl.
    *G06F 15/02*       (2006.01)
(52) U.S. Cl. ............... 705/32; 705/30; 705/301; 705/11; 235/376; 717/170; 706/52
(58) Field of Classification Search ............ 705/32, 705/26.82, 7.27, 30, 301, 8
    See application file for complete search history.

(56) References Cited

U.S. PATENT DOCUMENTS

| 7,725,354 | B2 * | 5/2010 | Schwarze et al. | 705/26.8 |
| 8,065,202 | B1 * | 11/2011 | Ballaro et al. | 705/27.2 |
| 2003/0033167 | A1 * | 2/2003 | Arroyo et al. | 705/1 |
| 2003/0074287 | A1 * | 4/2003 | Shuder et al. | 705/32 |
| 2004/0019542 | A1 * | 1/2004 | Fuchs et al. | 705/32 |
| 2005/0027651 | A1 * | 2/2005 | DeVault | 705/38 |
| 2011/0125622 | A1 * | 5/2011 | McCrea | 705/32 |

* cited by examiner

*Primary Examiner* — Vanel Frenel
(74) *Attorney, Agent, or Firm* — Kilpatrick Townsend & Stockton LLP

(57) ABSTRACT

This disclosure describes, generally, methods and systems for implementing an approval workflow engine and approval framework for timesheets, progress logs, and expenses. The method includes receiving, at an approval engine of an application server, information representing a timesheet, progress log, or expense. The approval engine may apply one or more rules to determine whether the rules are satisfied by corresponding attribute values of attributes for the timesheet, progress log, or expense. Notification may be generated and transmitted to one or more approvers and/or reviewers based on applications of the rules. An indication of approval and/or disapproval may be received from each of the approvers and/or reviewers. Rules may be defined for automatic assignment of multi level approvers, based on specific attributes. An approver may have the option to approve, deny, or push back a transaction. Approvers and submitters can have visibility of the full approval path and current approval status throughout an approval process. In addition, post approval adjustments can be routed for approval based on adjustment approval rules.

20 Claims, 16 Drawing Sheets

FIG. 5

| Favorites | Main Menu | > | Enterprise Components | > | Approvals | > | Approvals | > | Approvals | > | Approval Process Setup |

Setup Process Definitions

🗎 Clone Approval Process   🗎 Approval Process Viewer   |   🗎 Preview Approval Process Process ID: SP_TIMESHEET ~510
Definition ID: US001
Effective Date: 01/01/1990
Description:

🗎 Definition Criteria   |   🗎 Alert Criteria   |   🗎 Definition Notifications   |   🔑 Timeout Options

*Admin Role: SP_ADMINISTRATOR
*Status: Active ▽
Priority: 1

~520

☐ Default Process Definition
☑ Take Action on Line Completion
☐ User Auto Approval
☐ Route to Requester
☐ Include Requester ▶ Stages  ~530

*Stage Number: 10   Description: Timesheet Amount

▶ Paths  ~540

Description: Timesheet Amount   *Source: Static ▽   Level: Line ▽   🗎 Details | 🗎 Criteria  [-]

▶ Steps  ~550

| | Description | Approver User List | Details | Criteria | ~590 | |
|---|---|---|---|---|---|---|
| 560~ | 1. Requester | SP_TIME_WO_REQUESTER | 🗎 | 🗎 | ⇦ ⇨ | [-] |
| 570~ | 2. Requester's Supervisor | SP_TIME_WO_APPROVAL | 🗎 | 🗎 | ⇦ ⇨ | |
| 580~ | 3. Supervisor | SP_APPROVAL | 🗎 | 🗎 | ⇦ ⇨ | |

Criteria Definition — 600

*Criteria Type: [User Entered ▼] — 610
☑ All Criteria Need to Satisfy

▶ User Entered Criteria
Description: [Timesheet Status]

▶ Field Criteria
Record: [SPA_TIME_STL] — 620   Field Name: [TIME_ADJUSTED_FLG]

1. *Criteria Operator — 630   Value
   [Equals ▼]   [N]   [+] [−]

▶ Monetary Criteria
Amount Record: [SP_TIME_WO]   Amount Field: [TIME_AMOUNT]
Currency Field: [CURRENCY_CD]
Operator: [Greater Than ▼]
Amount: [50.000]
Currency Code: [USD]
Rate Type: [ ]

— 640

(OK) (CANCEL) (APPLY)

FIG. 9

| Favorites | Main Menu | > | Enterprise Components | > | Approvals | > | Approvals | > | Approval Process Setup |

Setup Process Definitions

🗐 Clone Approval Process | 📇 Approval Process Viewer | 🎯 Preview Approval Process Process ID: SP_PLOG ~910
Definition ID: US001
Effective Date: 01/01/1990
Description: [        ]

📇 Definition Criteria | 🗒 Alert Criteria | 🎯 Definition Notifications | 🔧 Timeout Options

~920

*Admin Role: SP_ADMINISTRATOR
*Status: Active ▾
Priority: 1

☑ Default Process Definiton
☑ Take Action on Line Completion
☐ User Auto Approval
☐ Route to Requester
☐ Include Requester ▶ Stages
*Stage Number: 10 ~930 Description: [Progress Log Amount]
▶ Paths ~940
Description: [Progress Log Amount] ~950  *Source: Static ▾  Level: Line ▾
▶ Steps

| | Description | Approver User List | Details | Criteria | 📇 Details | 📇 Criteria ~990 |
|---|---|---|---|---|---|---|
| 960 ~ 1. | Requester | SP_PLOG_WO_REQUESTER | 📇 | 📇 | ⇧ | ⇩ |
| 970 ~ 2. | Requester's Supervisor | SP_PLOG_WO_APPROVAL | 📇 | 📇 | ⇧ | ⇩ |
| 980 ~ 3. | Supervisor | SP_APPROVAL | 📇 | 📇 | ⇧ | ⇩ |

FIG. 10

Criteria Defintion — 1000

*Criteria Type: [User Entered ▼] — 1010

☑ All Criteria Need to Satisfy

▼ User Entered Criteria

Description: [Progress Log Status]

▼ Field Criteria

Record: [SAP_PLOG_STL] — 1020  Field Name: [SPA_ADJUSTED_FLG]   [+] [−]

1. *Criteria Operator — 1030  Value
   [Equals ▼]  [N]

▼ Monetary Criteria

Amount Record: [SAP_PLOG_DTL]  Amount Field: [SP_BILL_AMOUNT]   [+] [−]
Currency Field: [CURRENCY_CD]
Operator: [Greater Than ▼]
Amount: [50.000]                         ↘ 1040
Currency Code: [USD]
Rate Type: [CRRNT]

(OK) (CANCEL) (APPLY)

FIG. 13

Setup Process Definitions

| Favorites | Main Menu | > | Enterprise Components | > | Approvals | > | Approvals | > | Approval Process Setup |

Clone Approval Process | Approval Process Viewer 〜1310 | Preview Approval Process

- Process ID: SP_EXPENSE
- Definition ID: US001
- Effective Date: 01/01/1990
- Description:

Definition Criteria | Alert Criteria | Definition Notifications | Timeout Options

- *Admin Role: SP_ADMINISTRATOR
- *Status: Active
- Priority: 1

☑ Default Process Definition
☐ User Auto Approval
☐ Route to Requester
☐ Include Requester ▶ Stages 〜1330

*Stage Number: 10  Description: Expense Amount

▶ Paths 〜1340

Description: Expense Amount  *Source: Static  Level: Header  ∨

▶ Steps 〜1350

Details | Criteria 〜1390

| | Description | Approver User List | Details | Criteria | | | |
|---|---|---|---|---|---|---|---|
| 1. | Requester | SP_EX_WO_REQUESTER | | | ⇦ | ⇨ | − |
| 2. | Requester's Supervisor | SP_EX_WO_APPROVAL | | | ⇦ | ⇨ | − |
| 3. | Supervisor | SP_APPROVAL | | | ⇦ | ⇨ | − |

Criteria Defintion ~ 1400

*Criteria Type: [User Entered ▼] ~ 1410

☑ All Criteria Need to Satisfy

▶ User Entered Criteria

Description: [Adjustments]

▶ Field Criteria

Record: [SPA_SHEET_HDR ▼] ~ 1420    Field Name: [SPA_ADJUSTED_FLG ▼]    [+] [−]

*Criteria Operator ~ 1430    Value

1.   [Equals ▼]    [N]    [+] [−]

▶ Monetary Criteria

Amount Record: [      ]      Amount Field: [TIME_AMOUNT]
Currency Field: [      ]
Operator: [Greater Than ▼]
Amount: [0]                ~ 1440
Currency Code: [  ]
Rate Type: [    ]

(OK) (CANCEL) (APPLY)

APPROVAL WORKFLOW ENGINE FOR SERVICES PROCUREMENT TIMESHEETS, PROGRESS LOGS, AND EXPENSES

BACKGROUND OF THE INVENTION

This disclosure relates, in general, to techniques for approval of services procurement information and, more particularly, to approval workflow and frameworks for approval of transactions related to service providers.

Many organizations can spend a large share of their total budgets on services. Yet, few organizations have the same visibility into service costs as they do for goods and materials. For even the most efficient enterprises, service spending can be a black hole of unsourced buying, lost savings opportunities, and limited oversight from a purchasing department. Many traditional purchasing systems can be too inflexible to accommodate the wide variety of ways in which services are priced and contracted.

Standalone systems also typically lack workflow integration to critical business functions. As organizations continue to move to paperless systems, the complexity of managing service costs electronically within an organization can increase accordingly. In many instances, existing services procurement management and workflows are not sufficient to provide the functionality needed to process the wide variety of ways in which services are priced and contracted. For example, a service provider might submit information that requires approval from at least one manager, supervisor, or other appropriate person, department, etc. When there is only one service provider or all service providers contract with one person, this process can be relatively straightforward as the service providers can simply submit information to that person for approval. Problems arise, however, when there are multiple service providers providing multiple services to multiple persons and/or entities that then become responsible for approval.

Further, some services may require multiple layers of approval. An individual or entity making an initial approval might in turn report to more than one supervisor or supervising entity. Not only is this routing complexity not addressed in current systems, but current systems also do not provide a way to maintain service provider information throughout the various routing processes, as well as outside this processing, in order to make multiple routing and/or status determinations based thereon.

Accordingly, what is desired is to solve problems relating to managing service costs, some of which may be discussed herein. Additionally, what is desired is to reduce drawbacks related to managing service costs, some of which may be discussed herein.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

This disclosure describes methods and systems for implementing an approval workflow engine and approval framework for one or more transactions including timesheets, progress logs, and expenses. The method includes receiving, at an approval engine of an application server, information representing one or more transaction. The approval engine may apply one or more transaction rules to the one or more transactions to determine whether the rules are satisfied by corresponding attribute values of attributes associated with the one or more transactions. Notification may be generated and transmitted to one or more approvers and/or reviewers based on applications of the transaction rules. An indication of approval and/or disapproval may be received from each of the approvers and/or reviewers.

In some aspects, transaction rules may be defined for automatic assignment of multi level approvers, based on specific attributes. An approver may have the option to approve, deny, or push back a transaction. In further aspects, approvers and submitters may have visibility of the full approval path and current approval status throughout an approval process. In addition, post approval adjustments can be routed for approval based on adjustment approval rules.

In one embodiment, a method of implementing a timesheet approval workflow engine and approval framework can include receiving, at one or more computer systems, a set of timesheet approval rules. Each timesheet approval rule identifies one or more timesheet attributes and specifies one or more conditions that need to be satisfied by timesheet information for the timesheet approval rule to apply to a timesheet represented by the timesheet information. The set of timesheet approval rules can be stored in a database associated with the one or more computer systems. Information may be received representing a timesheet that includes a plurality of timesheet attributes and corresponding attribute values. One or more timesheet approval rules may be applied to the information representing the timesheet to determine whether the one or more timesheet approval rules are satisfied by the corresponding attribute values of the plurality of timesheet attributes. One or more approval notifications may be generated and sent to one or more approvers and/or reviewers based on application of the timesheet approval rules.

In some embodiments, information indicative of an approval, disapproval, or push back may be received from each of one or more approvers and/or reviewers. A hold indication for all or a portion of the information representing the timesheet may be received from a current approver in a sequence of one or more approvers. One or more notifications may be generated indicative of a reason for a hold and forwarded to an approver and/or reviewer based on a designated approver and/or reviewer established in a routing setup. The information representing the timesheet may then be modified based on information submitted by an approver relative to a current approver in a sequence of one or more approvers. In at least one aspect, the one or more timesheet approval rules may be re-applied in response to a modification of the information representing the timesheet. In further embodiments, receiving the information representing the timesheet may include receiving one or more line items and header information. In some embodiments, one or more notifications may be transmitted to one or more approvers and/or reviewers via email, instant messaging, SMS, MMS, or the like. An approval interface may be provided to or transmitted to approvers and/or reviewers. A display of timesheets needing approval may be provided via the interface in a consolidated view.

In still further embodiments, a method of implementing a progress log approval workflow engine and approval framework can include receiving, at one or more computer systems, a set of progress log approval rules. Each progress log approval rule may identify one or more progress log attributes and specify one or more conditions that need to be satisfied by progress log information for the progress log approval rule to apply to a progress log represented by the progress log information. The set of progress log approval rules may be stored in a database associated with the one or more computer systems. Information representing a progress log can be received where the information representing the progress log includes a plurality of progress log attributes and corresponding attribute values. One or more progress log approval rules can be applied to the information representing the progress log to determine whether the one or more progress log approval rules are satisfied by the corresponding attribute values of the plurality of progress log attributes. Accordingly, one or more approval notifications may be generated to one or more approvers and/or reviewers based on application of the progress log approval rules.

In some embodiments, information indicative of an approval, disapproval, or push back may be received from each of one or more approvers and/or reviewers. A hold indication for all or a portion of the information representing the progress log may be received from a current approver in a sequence of one or more approvers. One or more notifications may be generated indicative of a reason for a hold and forwarded to an approver and/or reviewer based on a designated approver and/or reviewer established in a routing setup. The information representing the progress log may then be modified based on information submitted by an approver relative to a current approver in a sequence of one or more approvers. In at least one aspect, the one or more progress log approval rules may be re-applied in response to a modification of the information representing the progress log. In further embodiments, receiving the information representing the progress log may include receiving one or more line items and header information. In some embodiments, one or more notifications may be transmitted to one or more approvers and/or reviewers via email, instant messaging, SMS, MMS, or the like. An approval interface may be provided to or transmitted to approvers and/or reviewers. A display of progress logs needing approval may be provided via the interface in a consolidated view.

In further embodiments, a method of implementing an expense approval workflow engine and approval framework can include receiving, at one or more computer systems, a set of expense approval rules. Each expense approval rule may identify one or more expense attributes and specify one or more conditions that need to be satisfied by expense information for the expense approval rule to apply to an expense represented by the expense information. The set of expense approval rules may be stored in a database associated with the one or more computer systems. Information representing an expense can be received where the information representing the expense includes a plurality of expense attributes and corresponding attribute values. One or more expense approval rules can be applied to the information representing the expense to determine whether the one or more expense approval rules are satisfied by the corresponding attribute values of the plurality of expense attributes. One or more approval notifications can be generated and forwarded to one or more approvers and/or reviewers based on application of the expense approval rules.

In some embodiments, information indicative of an approval, disapproval, or push back may be received from each of one or more approvers and/or reviewers. A hold indication for all or a portion of the information representing the expense may be received from a current approver in a sequence of one or more approvers. One or more notifications may be generated indicative of a reason for a hold and forwarded to an approver and/or reviewer based on a designated approver and/or reviewer established in a routing setup. The information representing the expense may then be modified based on information submitted by an approver relative to a current approver in a sequence of one or more approvers. In at least one aspect, the one or more expense approval rules may be re-applied in response to a modification of the information representing the expense. In further embodiments, receiving the information representing the expense may include receiving one or more line items and header information. In some embodiments, one or more notifications may be transmitted to one or more approvers and/or reviewers via email, instant messaging, SMS, MMS, or the like. An approval interface may be provided to or transmitted to approvers and/or reviewers. A display of expenses needing approval may be provided via the interface in a consolidated view.

Other systems for implementing at least some of the above discussed methods and further disclosed techniques are contemplated. Furthermore, computer-readable media are contemplated storing computer-executable code for implementing at least some of the above discussed methods and further disclosed techniques.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

FIG. 5 is an example of a user interface that may be used to create timesheet approval rules in one embodiment of the present invention.

FIG. 6 is an illustration of a user interface for defining criteria associated with one or more steps of timesheet approval rule associated with FIG. 5.

FIG. 9 is an example of a user interface that may be used to create progress log approval rules in one embodiment of the present invention.

FIG. 10 is an illustration of a user interface for defining criteria associated with steps of progress log approval rules associated with FIG. 9.

FIG. 13 is an example of a user interface that may be used to create expense approval rules in one embodiment of the present invention.

FIG. 14 is an illustration of a user interface for defining criteria associated with steps of expense approval rules associated with FIG. 13.

DETAILED DESCRIPTION OF THE INVENTION

Systems, methods, computer-readable storage media, and means in accordance with various embodiments can overcome one or more of aforementioned and other deficiencies in existing services procurement systems by providing for the handling of service provider information in order to properly route the service provider information. Further, the approach provides for storing service provider information between routing decisions in order to properly make subsequent routing decisions.

In order to better understand one or more of the inventions presented within this disclosure, aspects of at least one environment within which various embodiments may operate will first be described.

Figure 1:
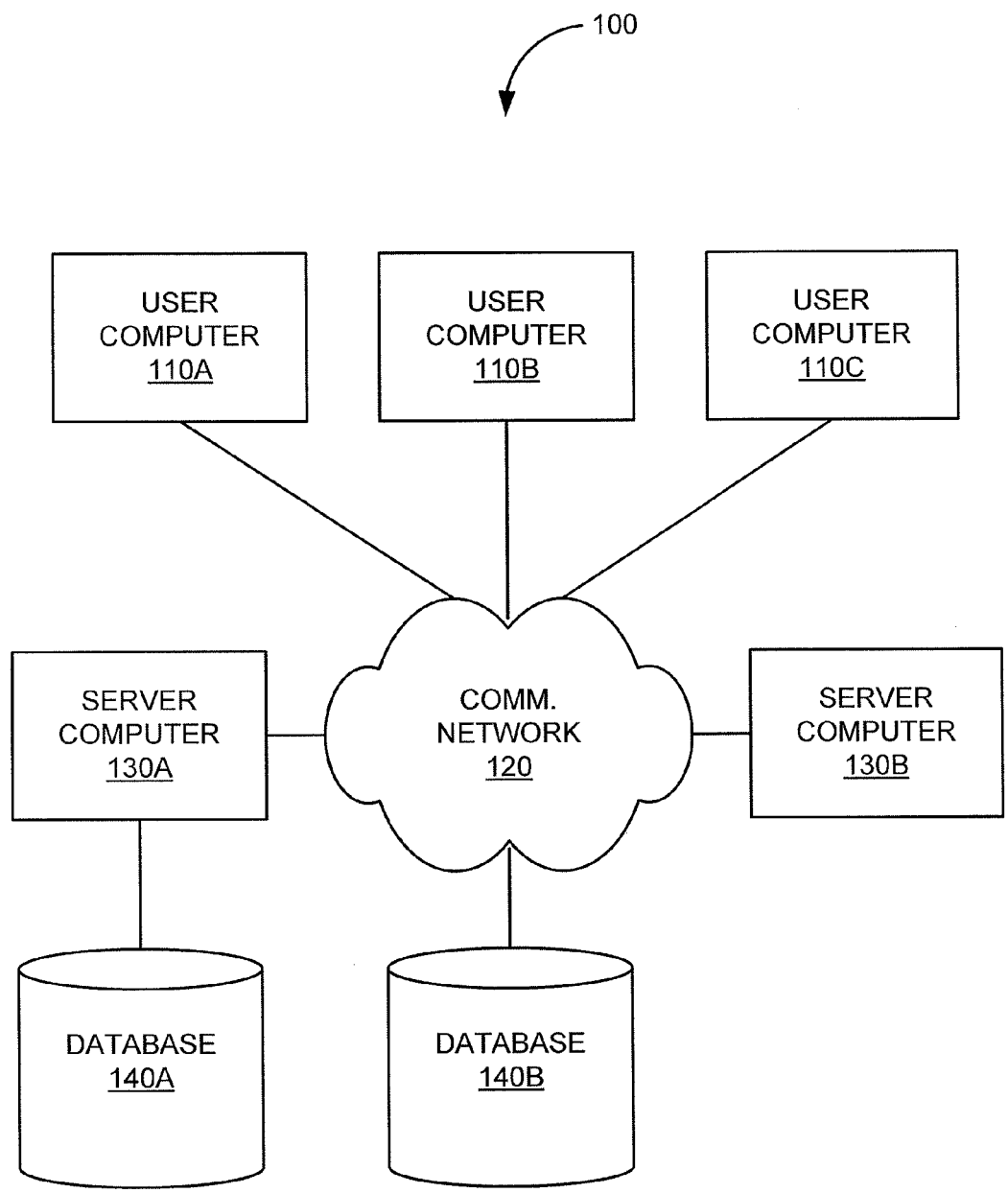
FIG. 1 is a simplified illustration of a system that may incorporate an embodiment of the present invention.

FIG. 1 is a simplified illustration of system 100 that may incorporate an embodiment or be incorporated into an embodiment of any of the innovations, embodiments, and/or examples found within this disclosure. FIG. 100 is merely illustrative of an embodiment incorporating the present invention and does not limit the scope of the invention as recited in the claims. One of ordinary skill in the art would recognize other variations, modifications, and alternatives.

In one embodiment, system 100 includes one or more user computers 110 (e.g., computers 110A, 110B, and 110C). User computers 110 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 110 can also have any of a variety of applications, including one or more applications configured to perform methods of the invention, as well as one or more office applications, database client and/or server applications, and web browser applications.

Alternatively, user computers 110 can be any other electronic device, such as a thin-client computer, Internet-enabled mobile telephone, and/or personal digital assistant, capable of communicating via a network (e.g., communications network 120 described below) and/or displaying and navigating web pages or other types of electronic documents. Although the exemplary system 100 is shown with three user computers, any number of user computers or devices can be supported.

Certain embodiments of the invention operate in a networked environment, which can include communications network 120. Communications network 120 can be any type of network familiar to those skilled in the art that can support data communications using any of a variety of commercially-available protocols, including without limitation TCP/IP, SNA, IPX, AppleTalk, and the like. Merely by way of example, communications network 120 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 130 (e.g., computers 130A and 130B). Each of server computers 130 may be configured with an operating system including without limitation any of those discussed above, as well as any commercially-available server operating systems. Each of server computers 130 may also be running one or more applications, which can be configured to provide services to one or more clients (e.g., user computers 110) and/or other servers (e.g., server computers 130).

Merely by way of example, one of server computers 130 may be a web server, which can be used, merely by way of example, to process requests for web pages or other electronic documents from user computers 110. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 110 to perform methods of the invention.

Server computers 130, in some embodiments, might include one or more file and or/application servers, which can include one or more applications accessible by a client running on one or more of user computers 110 and/or other server computers 130. Merely by way of example, one or more of server computers 130 can be one or more general purpose computers capable of executing programs or scripts in response to user computers 110 and/or other server computers 130, including without limitation web applications (which might, in some cases, be configured to perform methods of the invention).

Merely by way of example, a web application can be implemented as one or more scripts or programs written in any programming language, such as Java, C, or C++, and/or any scripting language, such as Perl, Python, or TCL, as well as combinations of any programming/scripting languages. The application server(s) can also include database servers, including without limitation those commercially available from Oracle, Microsoft, IBM and the like, which can process requests from database clients running on one of user computers 110 and/or another of server computers 130.

In some embodiments, an application server can create web pages dynamically for displaying the information in accordance with embodiments of the invention. Data provided by an application server may be formatted as web pages (comprising HTML, XML, Javascript, AJAX, etc., for example) and/or may be forwarded to one of user computers 110 via a web server (as described above, for example). Similarly, a web server might receive web page requests and/or input data from one of user computers 110 and/or forward the web page requests and/or input data to an application server.

In accordance with further embodiments, one or more of server computers 130 can function as a file server and/or can include one or more of the files necessary to implement methods of the invention incorporated by an application running on one of user computers 110 and/or another of server computers 130. Alternatively, as those skilled in the art will appreciate, a file server can include all necessary files, allowing such an application to be invoked remotely by one or more of user computers 110 and/or server computers 130. It should be noted that the functions described with respect to various servers herein (e.g., application server, database server, web server, file server, etc.) can be performed by a single server and/or a plurality of specialized servers, depending on implementation-specific needs and parameters.

In certain embodiments, system 100 can include one or more databases 140 (e.g., databases 140A and 140B). The location of the database(s) 140 is discretionary: merely by way of example, database 140A might reside on a storage medium local to (and/or resident in) server computer 130A (and/or one or more of user computers 110). Alternatively, database 140B can be remote from any or all of user computers 110 and server computers 130, so long as it can be in communication (e.g., via communications network 120) with one or more of these. In a particular set of embodiments, databases 140 can reside in a storage-area network ("SAN") familiar to those skilled in the art. (Likewise, any necessary files for performing the functions attributed to user computers 110 and server computers 130 can be stored locally on the respective computer and/or remotely, as appropriate). In one set of embodiments, one or more of databases 140 can be a relational database that is adapted to store, update, and retrieve data in response to SQL-formatted commands. Databases 140 might be controlled and/or maintained by a database server, as described above, for example.

In various embodiments, system 100 can overcome one or more of aforementioned and other deficiencies in existing services procurement systems by providing for the handling of service provider information in order to properly route the service provider information. Further, the approach provides for storing service provider information between routing decisions in order to properly make subsequent routing decisions.

Figure 2:
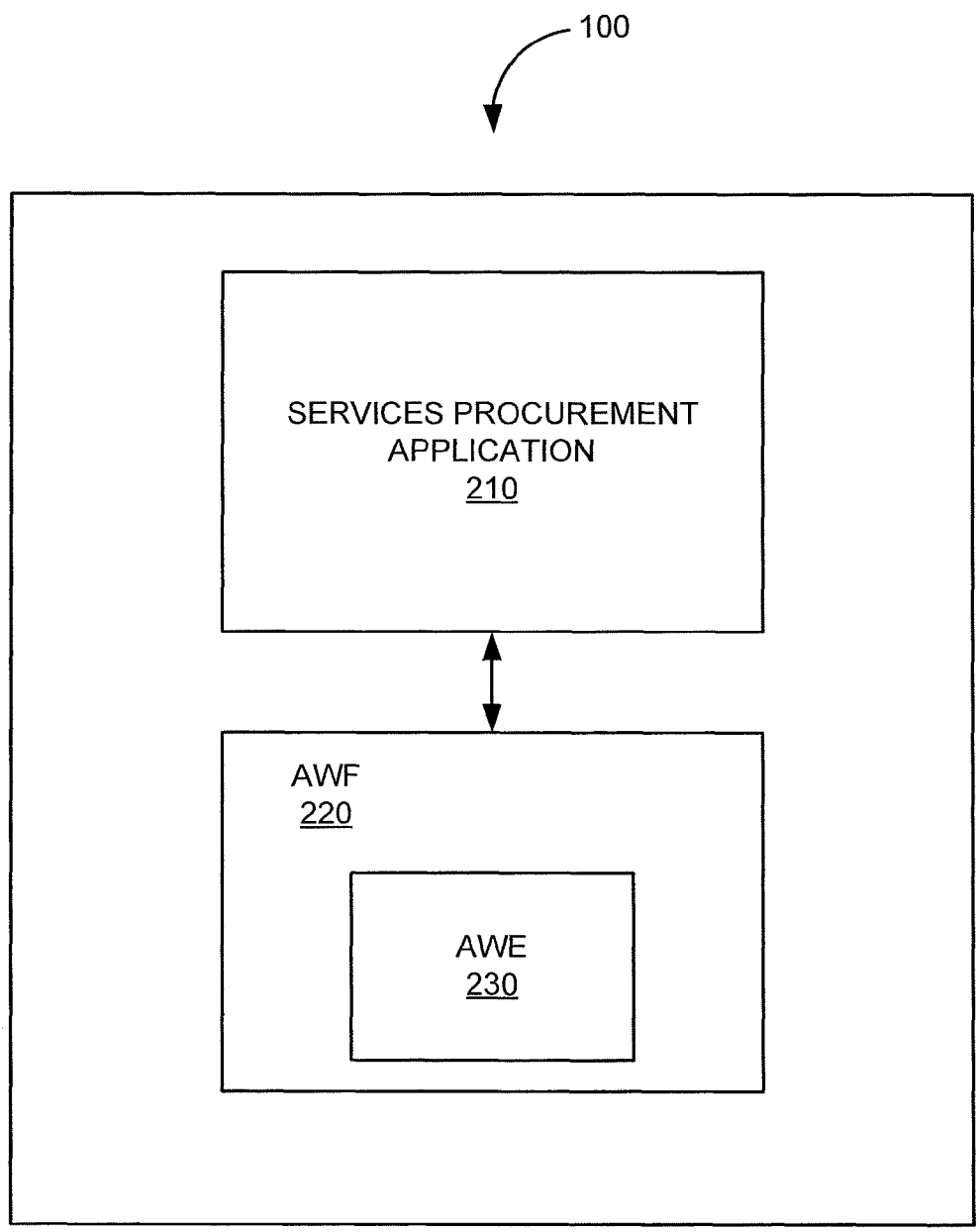
FIG. 2 is a simplified illustration of the system of FIG. 1 incorporating a Services Procurement Application and an Approval Workflow Framework in an embodiment of the present invention.

FIG. 2 is a simplified illustration of system 100 of FIG. 1 incorporating Services Procurement Application 210 and Approval Workflow Framework 220 in an embodiment of the present invention. In this example, Services Procurement Application 210 may include hardware and/or software elements configured for accommodating the complexity associated with buying services and providing an integrated approach for managing all services spend. One example of Services Procurement Application 210 may include "PeopleSoft Services Procurement" by PeopleSoft of Pleasanton, Calif., a division of Oracle of Redwood Shores, Calif., which may form part of the "PeopleSoft Supplier Relationship Management (SRM)" suite and integrate with other PeopleSoft applications, such as eProcurement, Purchasing, Accounts Payable, Project Costing, Talent Acquisition Management, and Resource Management.

In various embodiments, Services Procurement Application 210 may provide buyers, requestors, and suppliers secure access to a single, centralized contract so they can view and use the most up-to-date pricing, terms, and conditions. Services Procurement Application 210 may further, even when buying off contract (i.e., non-routine services), control services spending by providing a standardized request and approval framework. Services Procurement Application 210 may enable companies to create and enforce Agreements by centralizing master services contract management, standardize purchasing processes of all services via flexible services provisioning processes, apply negotiated rates to every requisition by leveraging approved supplier lists, control off-contract services spend with configurable contractor/service request, consistently apply spending checks enterprise-wide by utilizing rules-based policy and approval, and cut processing costs and eliminate over-billing. Services Procurement Application 210 may enable suppliers to proactively view service details, time cards, and approvals so they can identify billing problems early and eliminate them.

Approval Workflow Framework 220 may include hardware and/or software elements configured as a common framework (inside or outside that sits outside Services Procurement Application 210) that can be called from service provider transactions, updates, entries, etc. handled by Services Procurement Application 210. Approval Workflow Framework 220 can support many applications including and in addition to Services Procurement Application 210, and can be used to define and route transactions, information, etc. that require approvals, for example. Approval Workflow Framework 220 can include Approval Workflow Engine (AWE) 230 that provides the capability and framework for creating, running, and managing approval processes. AWE 230 may include hardware and/or software elements to determine how to process approvals using workflows. AWE 230 may use a series of database objects combined with application component configuration settings to determine how to process approvals using workflows.

In some embodiments, approval workflows can be triggered when users (e.g., a services provider, supplier, etc.) submit transactions. Some examples of transactions can include the submission of timesheets, progress logs, and procurement expenses, among others. Services Procurement Application 210 may pass a transaction over to the Approval Workflow Framework 220, which finds an appropriate approval process definition and launches the approval workflow using Approval Workflow Engine (AWE) 230. A set of approvers may then carry out tasks related to the transaction.

Approval Workflow Engine (AWE) 230 may allow multiple levels of users to develop, configure, and use transaction approvals that meet organizational requirements. In order to provide such functionality to Services Procurement Application 210, Services Procurement Application 210 can implement or integrate Approval Workflow Framework 220 in order to leverage the functionality. In one embodiment, application developers register Services Procurement Application 210 with AWE 230 and describe the application components, event handler, and records, for example. The developer also can create a record and table in which to store cross-reference information and set up notification templates for events. Services Procurement Application 210 then can make specific calls into Approval Workflow Framework 220. When a user submits a transaction for approval, Services Procurement Application 210 may launch an approval process whereby AWE 230 reads an approval process definition and queues the transaction for approval. An Approval Process Definition may be defined by a developer to include items such as stages, paths, steps, varying hierarchies, and criteria, among other configurable parameters. Each Approval Process Definition may include a process identifier (ID) that is registered with AWE 230.

Figure 3:
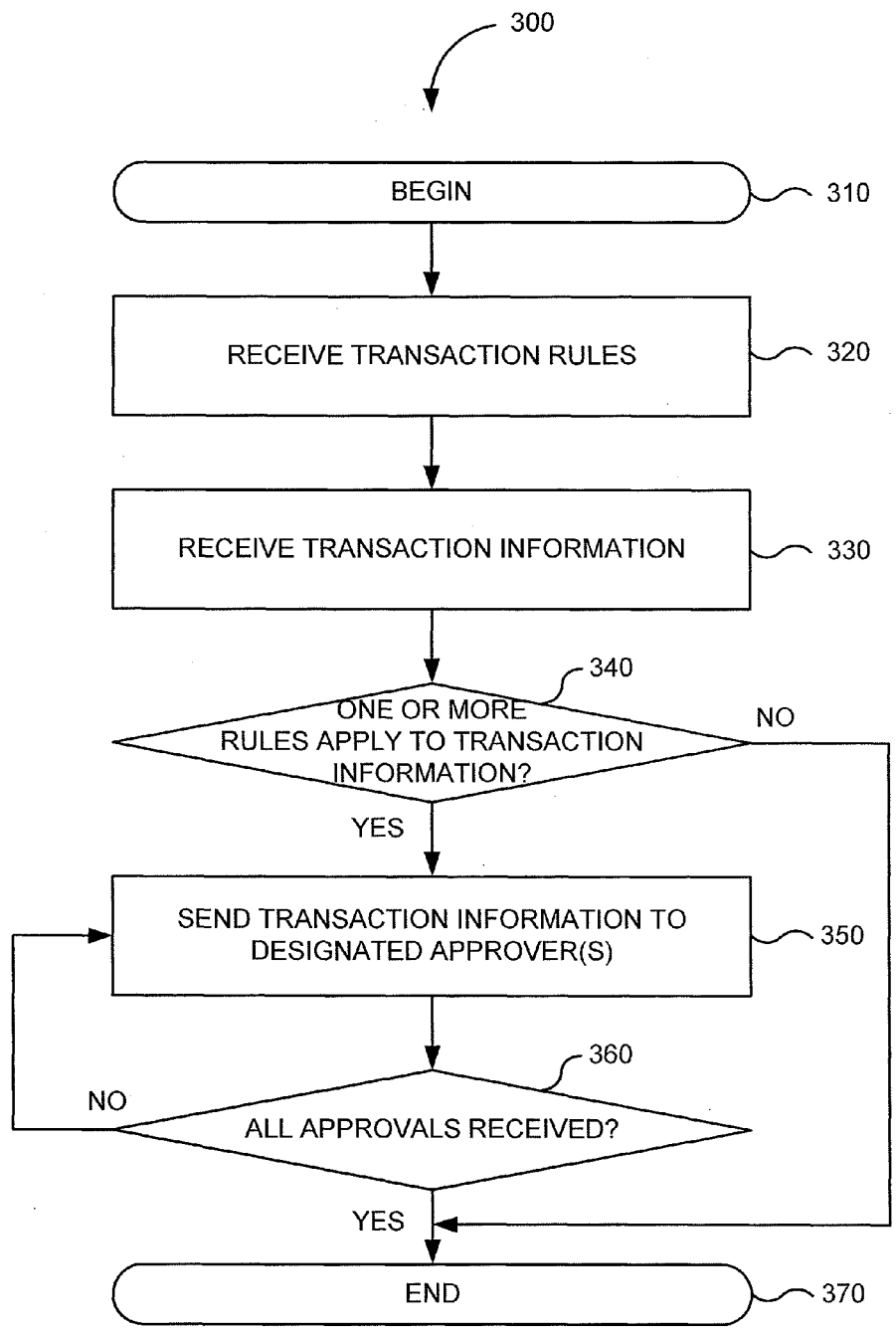
FIG. 3 is a simplified flowchart of method for implementing a transaction approval workflow engine and approval framework in an embodiment of the present invention.

FIG. 3 is a simplified flowchart of method 300 for implementing a transaction approval workflow engine and approval framework in an embodiment of the present invention. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, one or more transaction rules are received. A transaction rule can include information identifying transaction information, one or more conditions that may be satisfied by the identified transaction information, and one or more actions to be performed when the one or more conditions are satisfied by the identified transaction information. A transaction rule may also identify or otherwise be associated with one or more approvers whose approval may be needed to complete all or part of a transaction represented by the transaction information. An approver may be a predetermined individual or a predetermined role. An approver may further be a dynamically determined individual, entity, or role based on criteria satisfied by one or more transaction attributes. Furthermore, an approvers role may cause other approval workflows to be initiated resulting in identifying one or more additional approvers whose approval may be needed to complete all or part of a transaction represented by the transaction information.

Transaction rules may be stored in a database for subsequent retrieval by AWE 230. In various embodiments, some of the transaction rules may be predefined. In further embodiments, some of the transaction rules may be user-defined. A user may interact with system 100 via one or more user interfaces (e.g., graphical user interfaces) to define transaction rules and associate transaction rules with transaction information, types of transaction, or particular transactions. In still further embodiments, the one or more transaction rules may form part of one or more rules templates associated with a transaction, such as a timesheet, progress log, expense, expense report, or the like.

In step 330, transaction information is received. Transaction information can include any information related to a transaction. The transaction information may include attribute of the transactions, such as one or more entities that originated the transaction, one or more entities responsible for originating the transaction, one or more entities responsible for making payment based on the transaction, or more line items or itemizations and respective data points, chart of accounts, account designations, applicable percentages, types of services, total amount, or the like.

In step 340, a determination is made whether one or more transaction rules apply to the transaction information. In one embodiment, a transaction attribute in the transaction information may satisfy at least one of one or more conditions specified by one or more transaction rules for the one or more rules to apply. In another embodiment, combinations of transaction attributes in the transaction information may satisfy at least one of one or more conditions specified by one or more transaction rules for the one or more rules to apply.

In some embodiments, based on a determination that no transaction rules apply to the transaction information, the transaction information may be forwarded to a designated approver who may have the ability to either approve or deny a transaction represented by the transaction information. In further embodiments, based on a determination that one or more transaction rules apply to the transaction information, in step 350, the transaction information may be forwarded to one or more designated approvers who may have the ability to either approve or deny a transaction represented by the transaction information.

In one example of operation, Services Procurement Application 210 may present a transaction (or transaction information representing the transaction) to Approval Workflow Framework 220. In one embodiment, one or more timesheets corresponding to a work order may originate from one or more contingent workers and be destined for one or more contract managers or supervisors. In another embodiment, one or more progress logs corresponding to a requested service may originate from one or more service providers and be destined for one or more approvers that requested to the service. In yet another embodiment, one or more expense reports or expense itemizations corresponding to a work order may originate from one or more contingent workers and be destined for one or more contract managers or supervisors.

In these examples, a purchaser of a service may use Approval Workflow Framework 220 to evaluate and route timesheets, progress logs, and expenses, as well as manage service providers, check approvals for timesheets, progress logs, and expenses, set options and rules for timesheets, progress logs, and expenses, etc. Accordingly, in step 360, a determination may be made whether one or more rules have been associated with submitted timesheets, progress logs, and expenses. In one embodiment, a rules template may include the approval routing (i.e., who are the approvers and what is the order of approval) and other restrictions and/or approval requirements. In essence, any aspects of timesheets, progress logs, and expenses and/or individual line items of these may be subject to configurable rules which guide and direct the approval flow and process for their submission.

In forwarding or sending the transaction information to the one or more designated approvers in step 350, a designated approver may optionally acknowledge receipt of the transaction information. In one embodiment, communications regarding the forwarding or sending of the transaction information to the one or more designated approvers and other related activities may be transmitted via email, simple message service (SMS), voicemail, or other interrupting or non-interrupting messaging services. Further, an email message notification may provide access to a corresponding workflow environment directly in the email message (e.g., HTML email) enabling an approver to take actions directly from the email message. Also, Approval Workflow Framework 220 may provide approvers with selected views of the transaction information, a transaction represented by the transaction information, and any respective or related status in the approval process. Further, approvers may be given the option to take action on multiple transactions through a single view (e.g., mass approval options).

In forwarding or sending the transaction information to the one or more designated approvers in step 350, the transaction information may include multiple line items or itemizations. In one embodiment, each line item or itemization may need to be independently approved from other line items or itemizations. For example, if a transaction includes a first item and a second line item, an approval process for the first line item may be initiated at a different stage than an approval process for the second line item. Additionally, each line item or itemization may require different approvers, a different number of approvers, a hierarchy of approvers, etc. As such, approval from one or more approvers for one line item may be received before approval from one or more approvers for other line items. In another example, final approval for an entire transaction may be dependent upon complete approval of all line items.

For example, in step 360, a determination is made whether all approvals have been received. If, for example, at least one line item or itemization has not been approved, then method 300 may return to step 350 and resent the transaction information to approvers whose approval or disapproval is outstanding. Once all approvals or disapprovals have been received, or alternative resolution steps taken, method 300 ends in step 370.

Services Procurement Timesheets

In various embodiments, Services Procurement Application 210 and Approval Workflow Framework 220 work together allowing timesheets to be submitted by service providers (e.g., contingent workers) to be used as the basis for payment to the provider. In one embodiment, timesheets may be viewed and approved by appropriate individuals within an organization. Submitted timesheets may be routed to a specified approver, who has the ability to either approve or deny the transaction. In further embodiments, routing to multiple approval levels may be provided. In still further embodiments, one or more approval rules may be defined for a timesheet based on transaction attributes such as amount or chartfield values.

Figure 4:
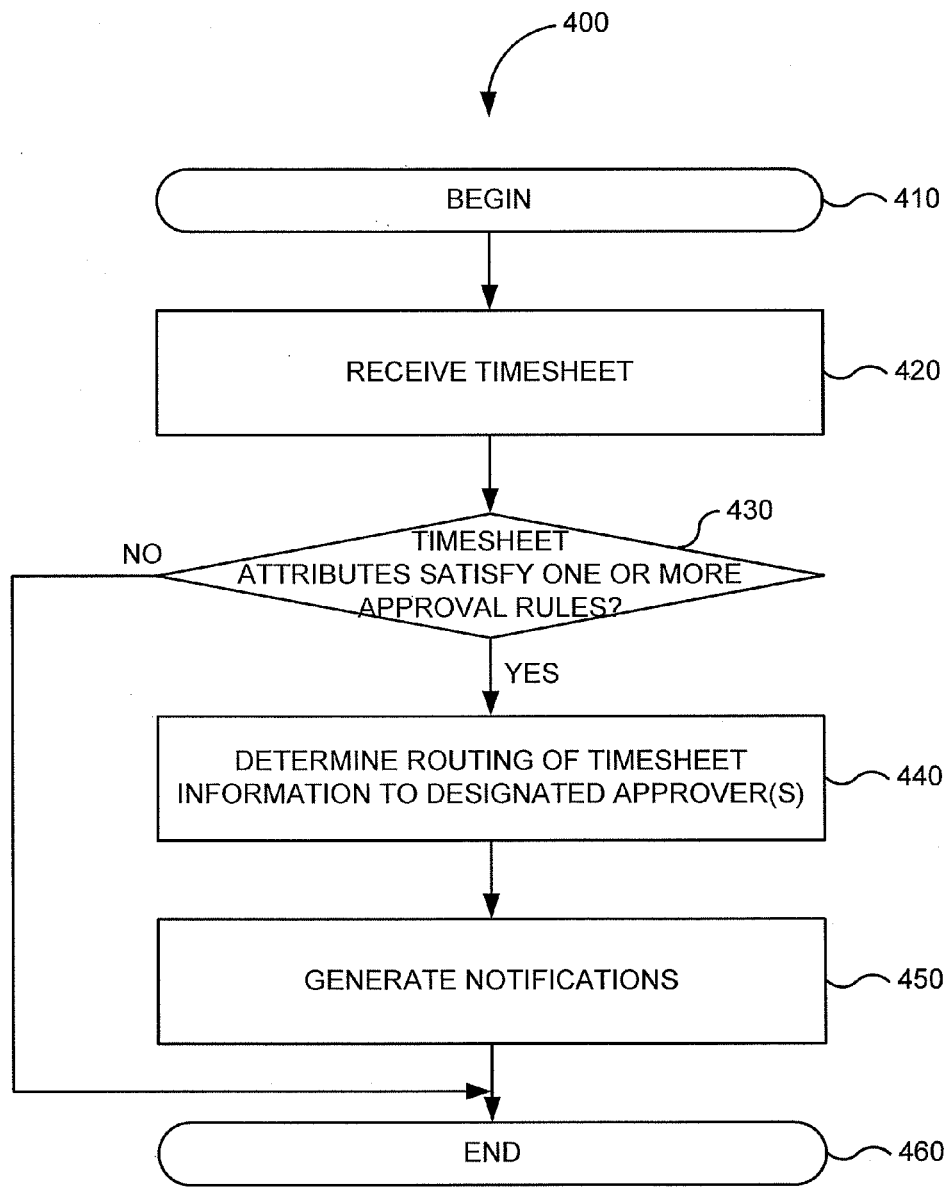
FIG. 4 is a flowchart of a method for implementing a timesheet approval workflow engine and approval framework in an embodiment of the present invention.

FIG. 4 is a flowchart of method 400 for implementing a timesheet approval workflow engine and approval framework in an embodiment of the present invention. Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 400 depicted in FIG. 4 begins in step 410.

In step 420, a timesheet is received. In one example, one or more timesheets may be submitted to or entered into Services Procurement Application 210. The timesheets may include information identifying an individual submitting or entering a timesheet, information identifying an individual or entity for whose time information is represented by a timesheet, information identifying an individual or entity responsible for payment based on a timesheet, or the like. The timesheet may further include one or more line items or itemizations describing details of a service performed, a type of service performed, time spent performing a service, a dollar amount for each service performed, or the like. A timesheet may further include a total amount for all service performance submitted. In some embodiments, a timesheet or attributes of a timesheet (such as those described above) may be associated with other portions of information, such as a chart of accounts, chartfield values, designations of payment or percentages of allocations, or the like.

In step 430, a determination is made whether one or more timesheet attributes satisfy one or more approval rules. In one embodiment, Services Procurement Application 210 and Approval Workflow Framework 220 may work together allowing users to define rules for automatic assignment of multi-level approvers based on the attributes of a specific timesheet. An approver may be provided the option to approve, deny, or push back a timesheet transaction. Approvers and submitter may be given visibility of the full approval path and current approval status throughout the approval process. In addition, post approval adjustments can also be routed for approval based on adjustment approval rules defined. Accordingly, an adjusted timesheet can be routed according to predefined rules for timesheet adjustments.

FIG. 5 is an example of user interface 500 that may be used to create timesheet approval rules in one embodiment of the present invention. In this example, user interface 500 includes information and/or functionality for a multi step approval rule 510 for timesheets. User interface 500 can include options 520 for further defining aspects of rule 510, such as definition criteria, alert criteria, definition notifications, timeout options, or the like. Rule 510 may include any number of stages 530, which may include any number of paths 540, which may further include any number of steps 550. In this example, the first 2 of steps 550 (e.g., steps 560 and 570) apply to original timesheets, and the 3rd of step 550 (e.g., step 580) applies to timesheet adjustments made by the final approver.

In various embodiments, criteria 590 for each of steps 550 may be defined at one or more levels, such as at a definition level, a stage path level, and a stage path step level. In one example, options for criteria at the definition level may be set as "Always True," "Application Class," or "User Entered." As would be expected, criteria set to "Always True" can be used for all transactions. Selection of an "Application Class" to define criteria can require adding logic to a related application class. Selection of "User Entered" can allow a relatively non technical user to specify the criteria for approval by selecting a record and field along with the criteria used to evaluate that record field. In further embodiments, criteria defined at a stage path level can be fairly generic, for example, such that any timesheets with a status that is not blank and a value greater than zero might be picked up for further evaluation in the path.

In another aspect, rules can be further broken done to allow specification for individual steps in an approval path. Criteria for a stage path step level can be set up similarly to a path level. FIG. 6 is an illustration of user interface 600 for defining criteria associated with step 560 of timesheet approval rule 510. In this example, the method of criteria definition is set as "User Entered" as indicated by criteria type 610. In some aspects, this allows the user to specify the particular record 620 and field for consideration. For example, an adjustment indicator on a detail timesheet record can be checked, and only those with a value of "No" may be included in the approval path.

In further aspects, field criteria 630 can be specified. Some available options in a field criteria operator lookup can include "Between", "Equals", Greater Than", "Is Blank", "Is Not Blank", "Less Than", and "Not Equal To". In still further aspects, monetary criteria 640 can be specified. Some available options in a monitory criteria operator lookup can include "Between (inclusive)", "Greater Than", and "Less Than". In one example as in FIG. 6, any timesheet with a time amount greater than $50 that is not an adjustment entry can be routed for approval according to the rules specified for step 560 of FIG. 5. Additional rules might include a second step to route to approver's supervisor if, for example, the time amount is greater than $200. In another example, step 580 for routing to the next level supervisor is implemented if the approver's supervisor makes an adjustment to the time amount. These particular field and value selections are merely meant as examples, any field can be chosen as a basis for defining the approval process flow.

Returning to FIG. 4, in some embodiments, based on a determination that no timesheet approval rules apply to the timesheet, the timesheet may be forwarded to a designated approver who may have the ability to either approve or deny the entire timesheet. In further embodiments, based on a determination that one or more timesheet approval rules apply to the timesheet, in step 440, routing of timesheet information to one or more designated approvers is determined. In one example, timesheet approval rules may provide for the automatic assignment of multi-level approvers based on attributes of the timesheet. In another example, timesheet approval rules may provide for multiple paths of approval based on attributes of the timesheet. In a further example, timesheet approval rules may provide for approval based on attributes of the timesheet, such as a dollar amount that exceeds a predetermined or computed threshold, type of account, chart of accounts, chartfield values, allocation values, type of service, or the like.

In step 450, one or more notifications may be generated. The notifications may be generated based on routing rules associated with the determined routing of the timesheet information. The notifications may be forwarded to one or more designated approvers who may have the ability to either approve or deny all or part of the timesheet. Method 400 ends in step 460.

Accordingly, in various embodiments, after reviewing submitted time details, an approver can make one or more decisions on whether to approve or deny a timesheet or timesheet line(s). If a transaction is approved, the transaction can be routed to subsequent approvers based on the approval rules defined. Once approved by all, a timesheet can be available for self billing and payment to a supplier. If a transaction is denied, the transaction can be routed back to a service provider for potential adjustment and/or correction and re-submittal. In some cases of multiple approvers, there may be one or more additional action available to an approver. For example, one option is the pushback. A pushback action sends a transaction back to a previous approver in a approval flow for questions or confirmation rather than taking it out of the approval flow by denying. a previous approver then may have the option to re approve (sending it back to the approver who did the pushback), adjust the transaction and then approve, deny the transaction based on the concerns raised (sending it back to the service provider), or if there were other approvers before him/her in the approval flow, the transaction can also be pushed back to the next previous approver, or the like.

Figure 7:
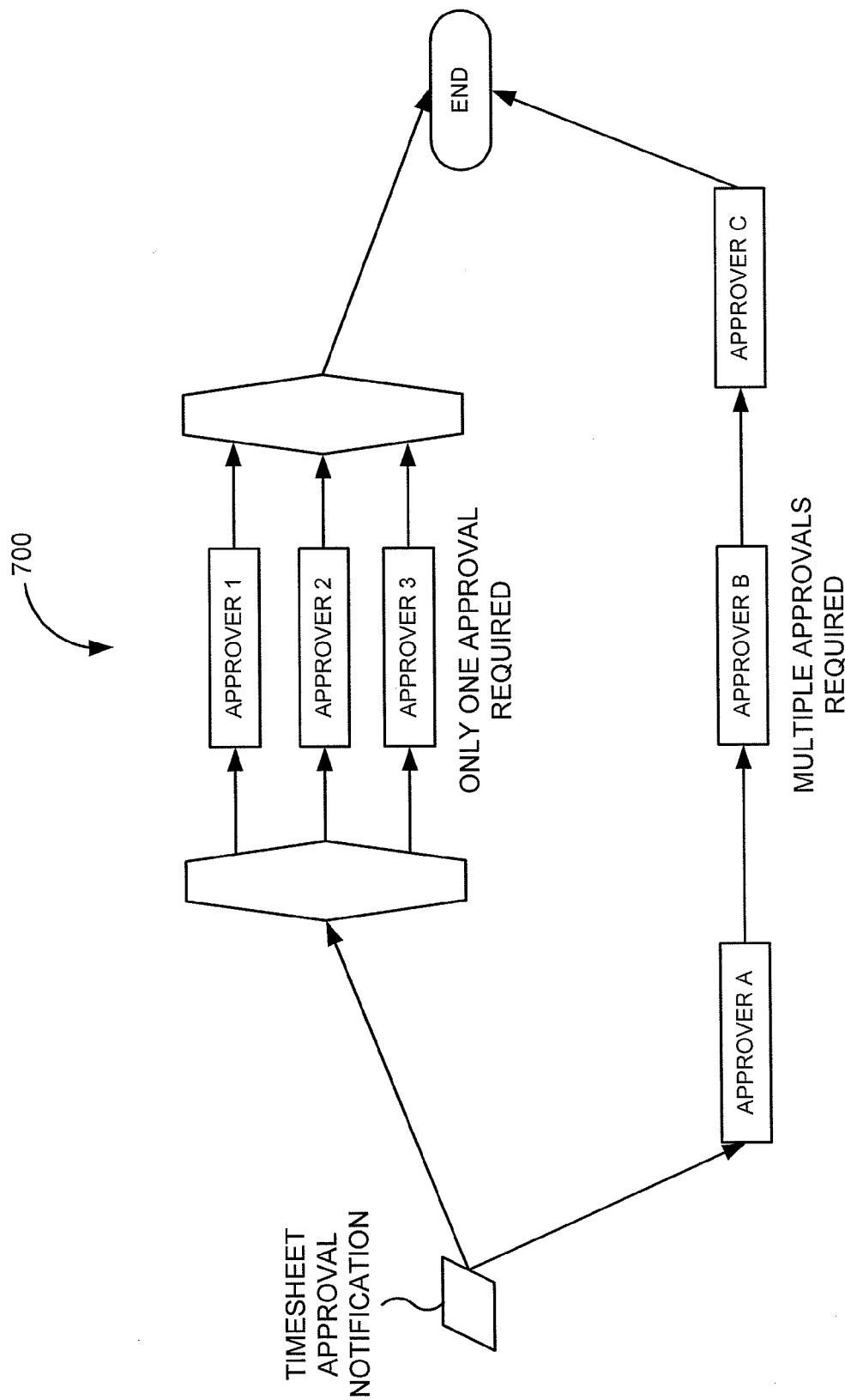
FIG. 7 is an example of a workflow that may be implemented using timesheet approval rules in one embodiment of the present invention.

FIG. 7 is an example of workflow 700 that may be implemented using timesheet approval rules in one embodiment of the present invention.

Services Procurement Progress Logs

In various embodiments, Services Procurement Application 210 and Approval Workflow Framework 220 work together allowing progress logs to be submitted by service providers to be used as the basis for payment to the provider. In one embodiment, progress logs may be viewed and approved by appropriate individuals within an organization. Submitted progress logs may be routed to a specified approver, who has the ability to either approve or deny the transaction. In further embodiments, routing to multiple approval levels may be provided. In still further embodiments, one or more approval rules may be defined for a progress log based on transaction attributes such as amount or chartfield values.

Figure 8:
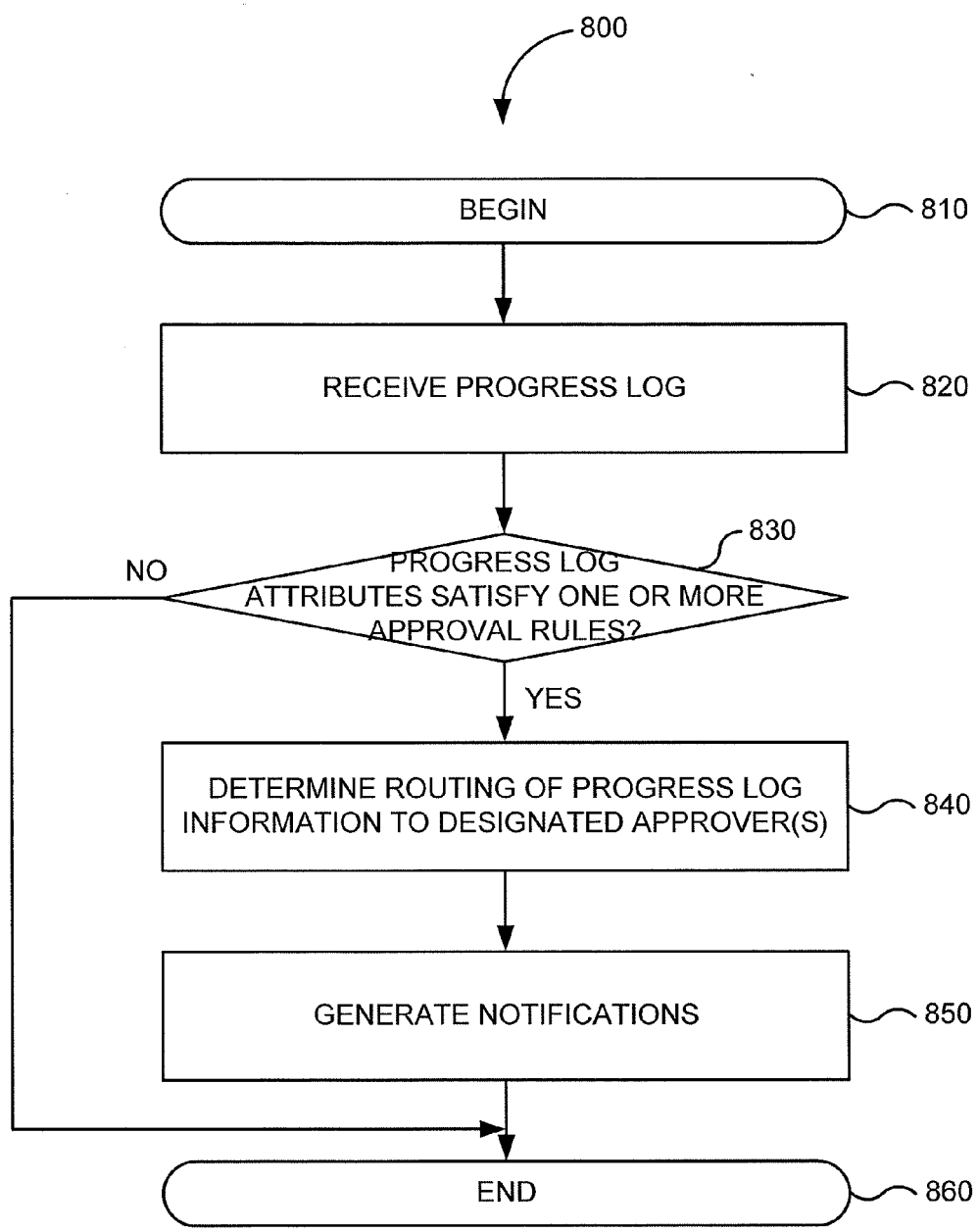
FIG. 8 is a flowchart of a method for implementing a progress log approval workflow engine and approval framework in an embodiment of the present invention.

FIG. 8 is a flowchart of method 800 for implementing a progress log approval workflow engine and approval framework in an embodiment of the present invention. Implementations of or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810.

In step 820, a progress log is received. In one example, one or more progress logs may be submitted to or entered into Services Procurement Application 210. The progress logs may include information identifying an individual submitting or entering a progress log, information identifying an individual or entity for whose progress is represented by a progress log, information identifying an individual or entity responsible for payment based on a progress log, or the like. A progress log may further include one or more line items or itemizations describing details of a service performed, a type of service performed, milestones completed in performing a service, an amount for each service performed, or the like. A progress log may further include a total quantification for all progress being submitted. In some embodiments, a progress log or attributes of a progress log (such as those described above) may be associated with other portions of information, such as a chart of accounts, chartfield values, designations of payment or percentages of allocations, or the like.

In step 830, a determination is made whether one or more progress log attributes satisfy one or more approval rules. In one embodiment, Services Procurement Application 210 and Approval Workflow Framework 220 may work together allowing users to define rules for automatic assignment of multi-level approvers based on the attributes of a specific progress log. An approver may be provided the option to approve, deny, or push back a progress log transaction. Approvers and submitter may be given visibility of the full approval path and current approval status throughout the approval process. In addition, post approval adjustments can also be routed for approval based on adjustment approval rules defined. Accordingly, an adjusted progress log can be routed according to predefined rules for progress log adjustments.

FIG. 9 is an example of user interface 900 that may be used to create progress log approval rules in one embodiment of the present invention. In this example, user interface 900 includes information and/or functionality for a multi step approval rule 910 for progress logs. User interface 900 can include options 920 for further defining aspects of rule 910, such as definition criteria, alert criteria, definition notifications, timeout options, or the like. Rule 910 may include any number of stages 930, which may include any number of paths 940, which may further include any number of steps 950. In this example, the first 2 of steps 950 (e.g., steps 960 and 970) apply to original progress logs, and the 3rd of step 950 (e.g., step 980) applies to progress logs adjustments made by the final approver.

In various embodiments, criteria 990 for each of steps 950 may be defined at one or more levels, such as at a definition level, a stage path level, and a stage path step level. In one example, options for criteria at the definition level may be set as "Always True," "Application Class," or "User Entered." As would be expected, criteria set to "Always True" can be used for all transactions. Selection of an "Application Class" to define criteria can require adding logic to a related application class. Selection of "User Entered" can allow a relatively non technical user to specify the criteria for approval by selecting a record and field along with the criteria used to evaluate that record field. In further embodiments, criteria defined at a stage path level can be fairly generic, for example, such that any progress logs with a status that is not blank and a value greater than zero might be picked up for further evaluation in the path.

In another aspect, rules can be further broken done to allow specification for individual steps in an approval path. Criteria for a stage path step level can be set up similarly to a path level. FIG. 10 is an illustration of user interface 1000 for defining criteria associated with step 960 of progress log approval rule 910. In this example, the method of criteria definition is set as "User Entered" as indicated by criteria type 1010. In some aspects, this allows the user to specify the particular record 1020 and field for consideration. For example, an adjustment indicator on a detail progress log record can be checked, and only those with a value of "No" may be included in the approval path.

In further aspects, field criteria 1030 can be specified. Some available options in a field criteria operator lookup can include "Between", "Equals", Greater Than", "Is Blank", "Is Not Blank", "Less Than", and "Not Equal To". In still further aspects, monetary criteria 1040 can be specified. Some available options in a monitory criteria operator lookup can include "Between (inclusive)", "Greater Than", and "Less Than". In one example as in FIG. 10, any progress log with a progress amount greater than $50 that is not an adjustment entry will be routed for approval according to the rules specified for step 960 of FIG. 9. Additional rules might include a previous step to route to approver's subordinate prior to routing to this approver for example, for an initial approval. In one example, step 980 for routing to the next level supervisor is implemented if the approver makes an adjustment to the progress amount. These particular field and value selections are merely meant as examples, any field can be chosen as a basis for defining the approval process flow.

Returning to FIG. 8, in some embodiments, based on a determination that no progress log approval rules apply to the progress log, the progress log may be forwarded to a designated approver who may have the ability to either approve or deny the entire progress log. In further embodiments, based on a determination that one or more progress log approval rules apply to the progress log, in step 840, routing of progress log information to one or more designated approvers is determined. In one example, progress log approval rules may provide for the automatic assignment of multi-level approvers based on attributes of the progress log. In another example, progress log approval rules may provide for multiple paths of approval based on attributes of the progress log. In a further example, progress log approval rules may provide for approval based on attributes of the progress log, such as whether an amount of progress exceeds a predetermined or computed threshold, a type of account, chart of accounts, chartfield values, allocation values, type of service, or the like.

In step 850, one or more notifications may be generated. The notifications may be generated based on routing rules associated with the determined routing of the progress log information. The notifications may be forwarded to one or more designated approvers who may have the ability to either approve or deny all or part of the progress log. Method 800 ends in step 860.

In various embodiments, after reviewing any submitted progress details, an approver may make a decision on whether to approve or deny one or more progress logs or progress line(s). If the transaction is approved, the transaction can be routed to subsequent approvers based on the approval rules defined, and once approved by all, a progress log can be available for other actions or activities, such as billing, payment to the supplier, etc. If a transaction is denied, the transaction may be routed back to a service provider for potential adjustment and/or correction and resubmittal. In the case of multiple approvers, one or more additional action may be available to an approver. One option is the pushback. A pushback action can send a transaction back to a previous approver in an approval flow for questions or confirmation rather than taking the transaction out of the approval flow by denying. A previous approver then can have the option to re-approve (sending it back to the approver who did the pushback), adjust the transaction and then approve, deny the transaction based on the concerns raised (sending it back to the service provider), or if there were other approvers before him/her in the approval flow, the transaction can also be pushed back to the next previous approver.

Figure 11:
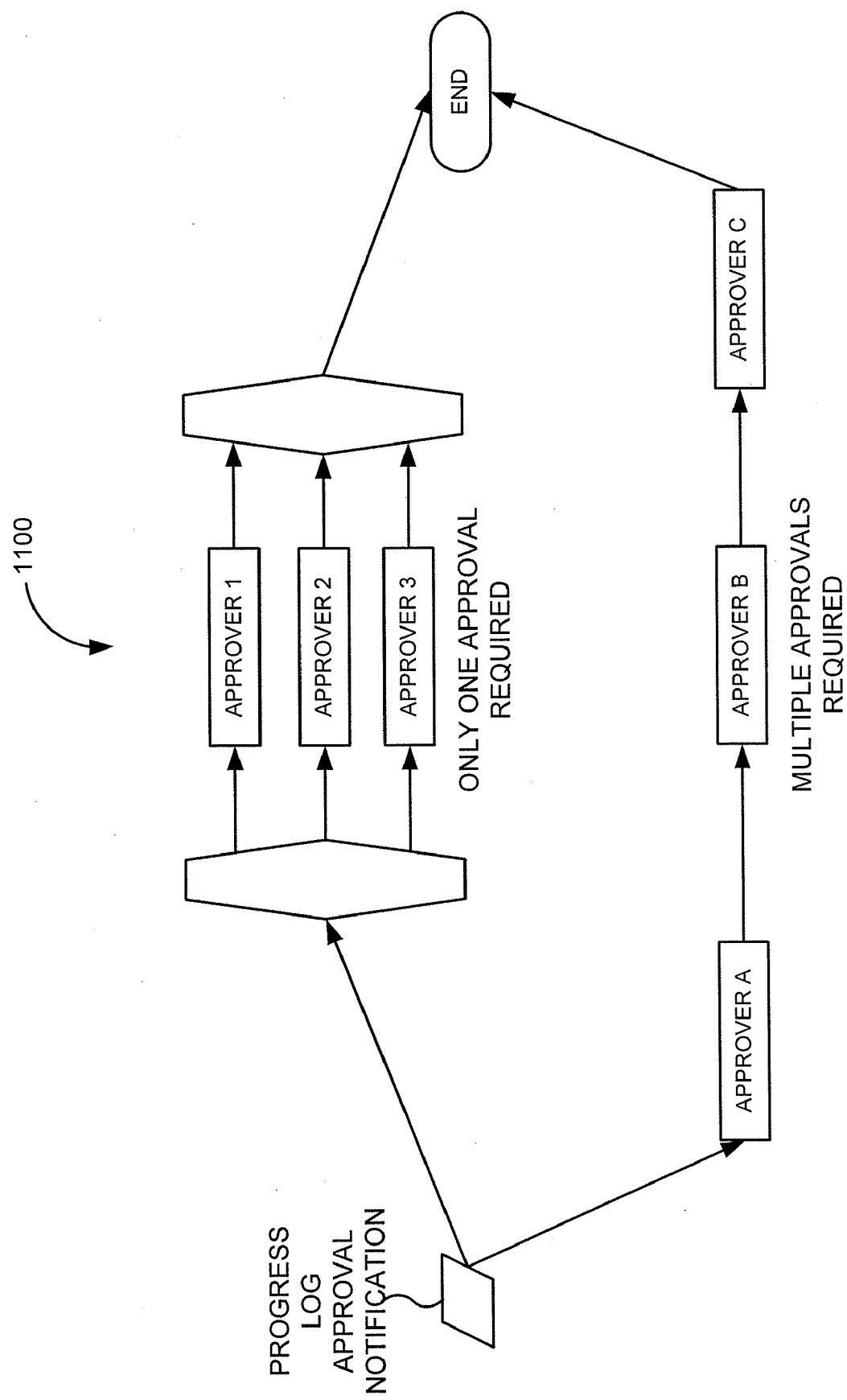
FIG. 11 is an example of a workflow that may be implemented using progress log approval rules in one embodiment of the present invention.

FIG. 11 is an example of workflow 1100 that may be implemented using progress log approval rules in one embodiment of the present invention.

Services Procurement Expenses

In various embodiments, Services Procurement Application 210 and Approval Workflow Framework 220 work together allowing expenses to be submitted by service providers (e.g., contingent workers) to be used as the basis for payment to the provider. In one embodiment, expenses may be viewed and approved by appropriate individuals within an organization. Submitted expenses may be routed to a specified approver, who has the ability to either approve or deny the transaction. In further embodiments, routing to multiple approval levels may be provided. In still further embodiments, one or more approval rules may be defined for expenses based on expense report attributes such as amount or chartfield values.

Figure 12:
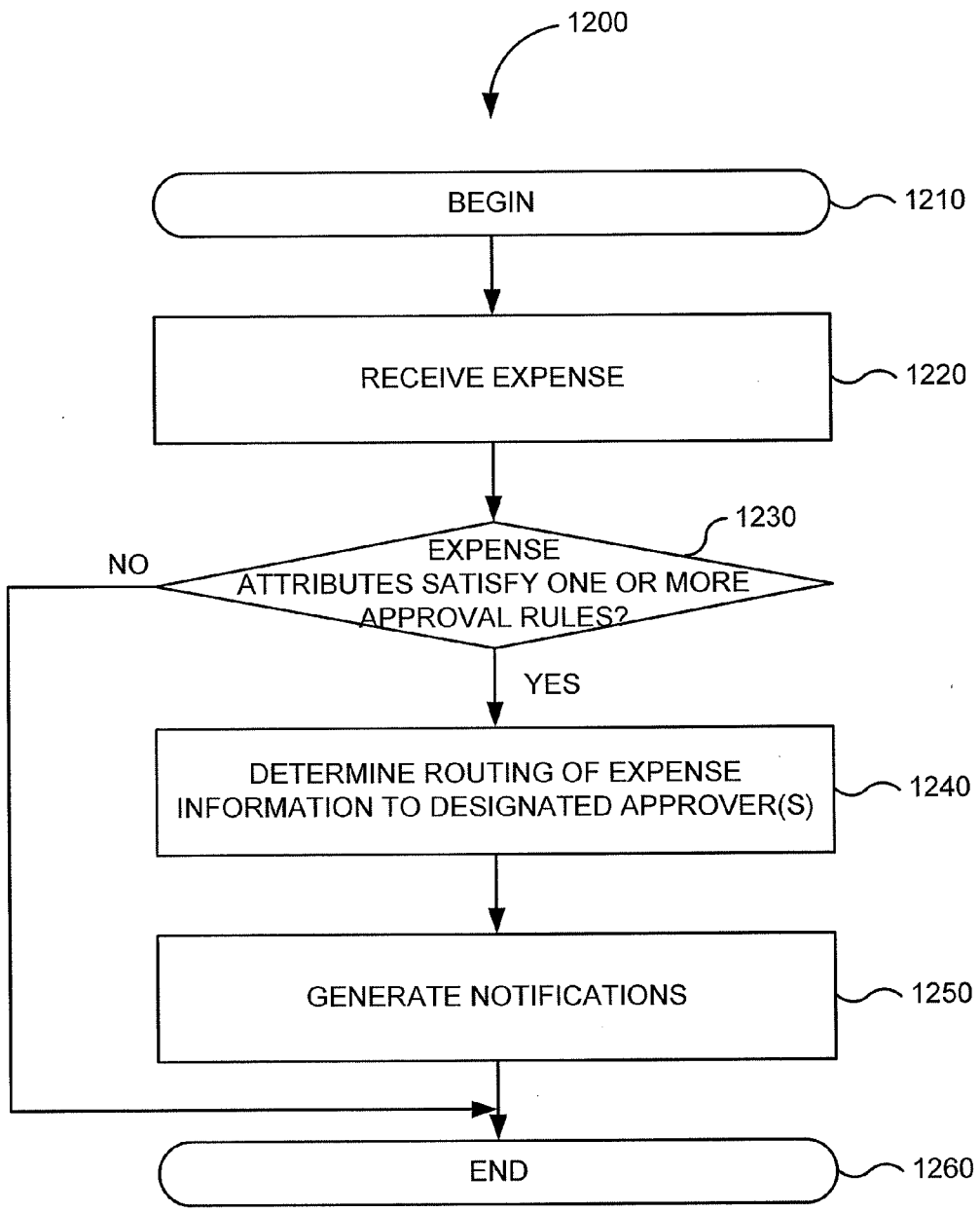
FIG. 12 is a flowchart of a method for implementing an expense approval workflow engine and approval framework in an embodiment of the present invention.

FIG. 12 is a flowchart of method 1200 for implementing an expense approval workflow engine and approval framework in an embodiment of the present invention. Implementations of or processing in method 1200 depicted in FIG. 12 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1200 depicted in FIG. 12 begins in step 1210.

In step 1220, an expense is received. In one example, one or more expenses or expense reports may be submitted to or entered into Services Procurement Application 210. The expenses may include information identifying an individual submitting or entering an expense, information identifying an individual or entity for whose progress is represented by an expense, information identifying an individual or entity responsible for payment based on an expense, or the like. An expense or expense report may further include one or more line items or itemizations describing details of an expense, a type of expense, an amount for each expense, or the like. An expense or expense submission may further include a total quantification for all expenses being submitted. In some embodiments, an expense or attributes of an expense (such as those described above) may be associated with other portions of information, such as a chart of accounts, chartfield values, designations of payment or percentages of allocations, or the like.

In step 1230, a determination is made whether one or more expense attributes satisfy one or more approval rules. In one embodiment, Services Procurement Application 210 and Approval Workflow Framework 220 may work together allowing users to define rules for automatic assignment of multi-level approvers based on the attributes of a specific expense. An approver may be provided the option to approve, deny, or push back an expense transaction. Approvers and submitter may be given visibility of the full approval path and current approval status throughout the approval process. In addition, post approval adjustments can also be routed for approval based on adjustment approval rules defined. Accordingly, an adjusted expense can be routed according to predefined rules for expense adjustments.

FIG. 13 is an example of user interface 1300 that may be used to create expense approval rules in one embodiment of the present invention. In this example, user interface 1300 includes information and/or functionality for a multi step approval rule 1310 for expenses. User interface 1300 can include options 1320 for further defining aspects of rule 1310, such as definition criteria, alert criteria, definition notifications, timeout options, or the like. Rule 1310 may include any number of stages 1330, which may include any number of paths 1340, which may further include any number of steps 1350. In this example, the first 2 of steps 1350 (e.g., steps 1360 and 1370) apply to original expenses, and the 3rd of step 1350 (e.g., step 1380) applies to expense adjustments made by the final approver.

In various embodiments, criteria 1390 for each of steps 1350 may be defined at one or more levels, such as at a definition level, a stage path level, and a stage path step level. In one example, options for criteria at the definition level may be set as "Always True," "Application Class," or "User Entered." As would be expected, criteria set to "Always True" can be used for all transactions. Selection of an "Application Class" to define criteria can require adding logic to a related application class. Selection of "User Entered" can allow a relatively non technical user to specify the criteria for approval by selecting a record and field along with the criteria used to evaluate that record field. In further embodiments, criteria defined at a stage path level can be fairly generic, for example, such that any expense sheets with a status that is not blank and a value greater than zero might be picked up for further evaluation in the path.

In another aspect, rules can be further broken done to allow specification for individual steps in an approval path. Criteria for a stage path step level can be set up similarly to a path level. FIG. 14 is an illustration of user interface 1400 for defining criteria associated with step 1360 of expense approval rule 1310. In this example, the method of criteria definition is set as "User Entered" as indicated by criteria type 1410. In some aspects, this allows the user to specify the particular record 1420 and field for consideration. For example, an adjustment indicator on a detail expense sheet record can be checked, and only those with a value of "No" may be included in the approval path.

In further aspects, field criteria 1430 can be specified. Some available options in a field criteria operator lookup can include "Between", "Equals", Greater Than", "Is Blank", "Is Not Blank", "Less Than", and "Not Equal To". In still further aspects, monetary criteria 1440 can be specified. Some available options in a monitory criteria operator lookup can include "Between (inclusive)", "Greater Than", and "Less Than". In one example as in FIG. 14, any expense sheet with an "Adjusted" status will be routed for approval according to the rules specified for step 1360 of FIG. 13. Additional rules might include a previous step to route to approver's subordinate prior to routing to this approver for example, for an initial approval. In one example, step 1380 for routing to the next level supervisor is implemented if the approver makes an adjustment to a transaction amount. These particular field and value selections are merely meant as examples, any field can be chosen as a basis for defining the approval process flow.

Returning to FIG. 12, in some embodiments, based on a determination that no expense approval rules apply to the expense, the expense may be forwarded to a designated approver who may have the ability to either approve or deny the entire expense. In further embodiments, based on a determination that one or more expense approval rules apply to the expense, in step 1240, routing of expense information to one or more designated approvers is determined. In one example, expense approval rules may provide for the automatic assignment of multi-level approvers based on attributes of the expense. In another example, expense approval rules may provide for multiple paths of approval based on attributes of the expense. In a further example, expense approval rules may provide for approval based on attributes of the expense, such as whether an amount of an expense exceeds a predetermined or computed threshold, a type of account, chart of accounts, chartfield values, allocation values, type of service, or the like.

In step 1250, one or more notifications may be generated. The notifications may be generated based on routing rules associated with the determined routing of the expense information. The notifications may be forwarded to one or more designated approvers who may have the ability to either approve or deny all or part of the expense. Method 1200 ends in step 1260.

In one aspect, after reviewing submitted expense details, an approver may make a decision on whether to approve or deny an expense sheet. If a transaction is approved, the transaction may be routed to subsequent approvers based on the approval rules defined, and once approved by all, an expense sheet may be available for other actions or activities, such as self billing, payment to the supplier, etc. If a transaction is denied, the transaction may be routed back to the service provider for potential adjustment and/or correction and resubmittal. In the case of multiple approvers, one or more other actions may be available to an approver. One option is the pushback. A pushback action sends the transaction back to the previous approver in the approval flow for questions or confirmation rather than taking it out of the approval flow by denying. The previous approver then has the option to re approve (sending it back to the approver who did the pushback), adjust the transaction and then approve, deny the transaction based on the concerns raised (sending it back to the service provider), or if there were other approvers before him/her in the approval flow, the transaction can also be pushed back to the next previous approver.

Figure 15:
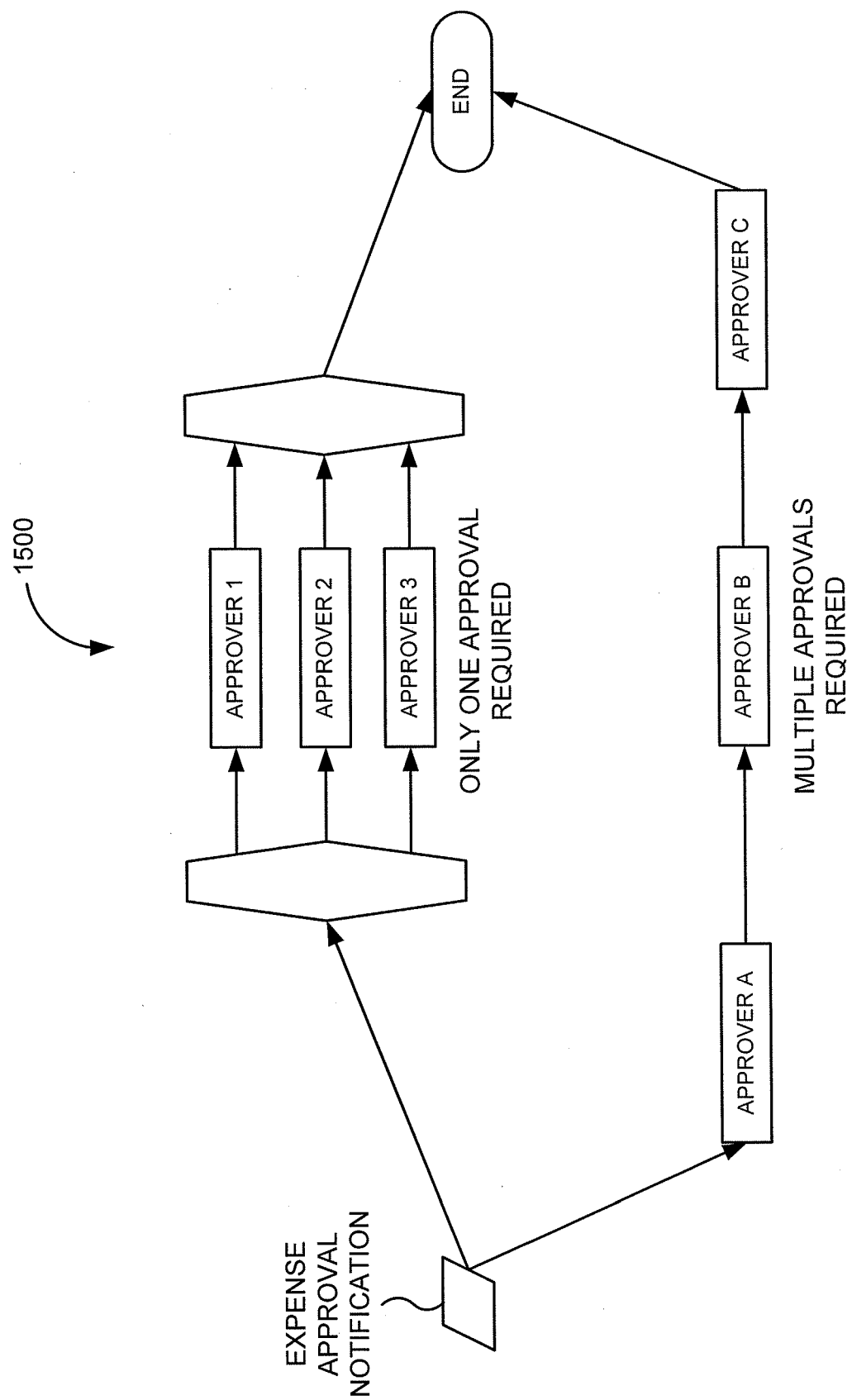
FIG. 15 is an example of a workflow that may be implemented using expense approval rules in one embodiment of the present invention.

FIG. 15 is an example of workflow 1500 that may be implemented using expense approval rules in one embodiment of the present invention.

Figure 16:
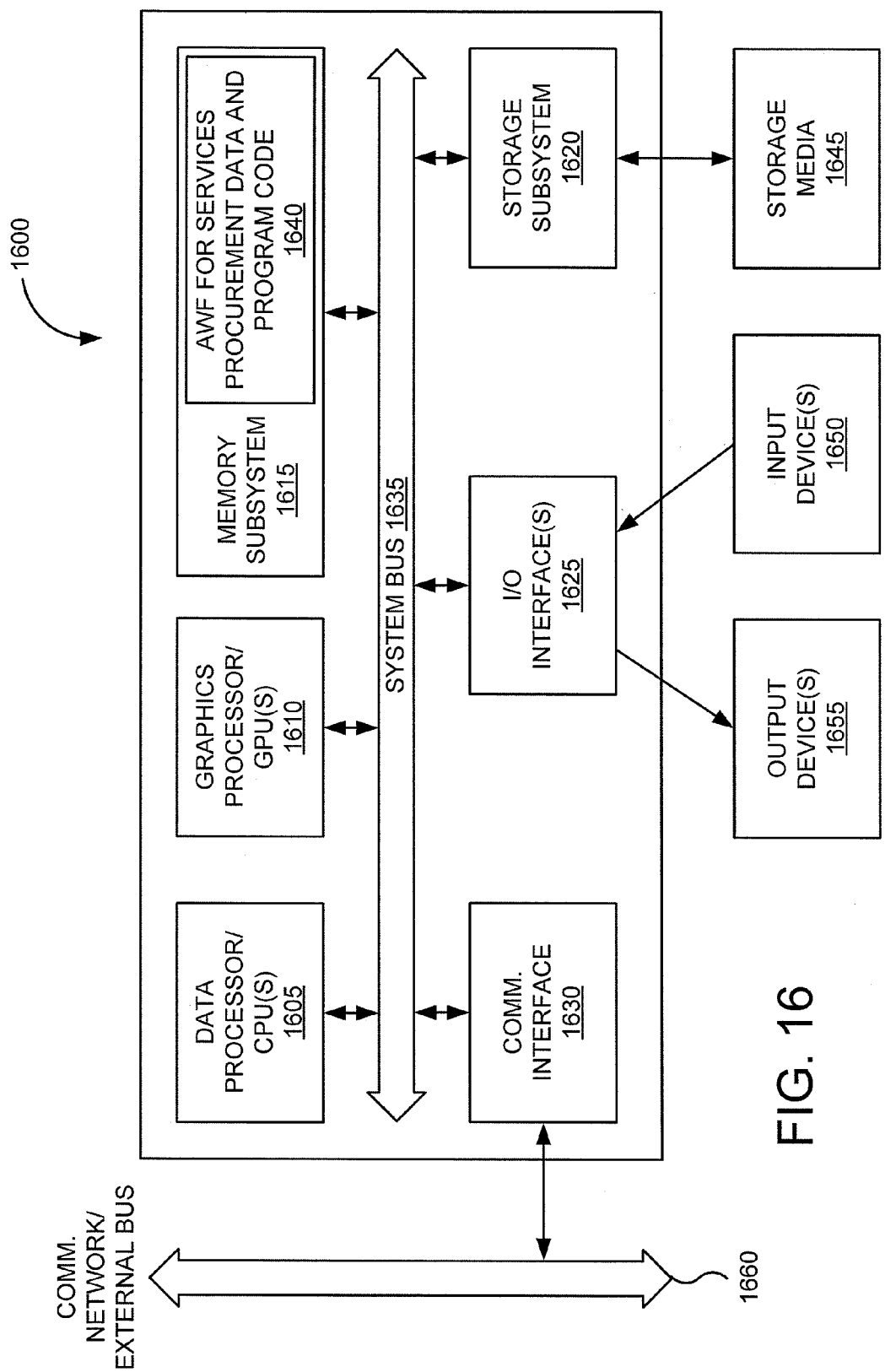
FIG. 16 is a block diagram of a computer system or information processing device that may incorporate an embodiment, be incorporated into an embodiment, or be used to practice any of the innovations, embodiments, and/or examples found within this disclosure.

FIG. 16 is a block diagram of computer system 1600 that may incorporate an embodiment, be incorporated into an embodiment, or be used to practice any of the innovations, embodiments, and/or examples found within this disclosure. FIG. 16 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1600 can include hardware and/or software elements configured for performing logic operations and calculations, input/output operations, machine communications, or the like. Computer system 1600 may include familiar computer components, such as one or more one or more data processors or central processing units (CPUs) 1605, one or more graphics processors or graphical processing units (GPUs) 1610, memory subsystem 1615, storage subsystem 1620, one or more input/output (I/O) interfaces 1625, communications interface 1630, or the like. Computer system 1600 can include system bus 1635 interconnecting the above components and providing functionality, such connectivity and inter-device communication. Computer system 1600 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1605 can include hardware and/or software elements configured for executing logic or program code or for providing application-specific functionality. Some examples of CPU(s) 1605 can include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. CPU(s) 1605 may also include one or more field-gate programmable arrays (FPGAs), application-specific integrated circuits (ASICs), or other microcontrollers. The one or more data processors or central processing units (CPUs) 1605 may include any number of registers, logic units, arithmetic units, caches, memory interfaces, or the like. The one or more data processors or central processing units (CPUs) 1605 may further be integrated, irremovably or moveably, into one or more motherboards or daughter boards.

The one or more graphics processor or graphical processing units (GPUs) 1610 can include hardware and/or software elements configured for executing logic or program code associated with graphics or for providing graphics-specific functionality. GPUs 1610 may include any conventional graphics processing unit, such as those provided by conventional video cards. Some examples of GPUs are commercially available from NVIDIA, ATI, and other vendors. In various embodiments, GPUs 1610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 1610 may include any number of registers, logic units, arithmetic units, caches, memory interfaces, or the like. The one or more data processors or central processing units (CPUs) 1605 may further be integrated, irremovably or moveably, into one or more motherboards or daughter boards that include dedicated video memories, frame buffers, or the like.

Memory subsystem 1615 can include hardware and/or software elements configured for storing information. Memory subsystem 1615 may store information using machine-readable articles, information storage devices, or computer-readable storage media. Some examples of these articles used by memory subsystem 1615 can include random access memories (RAM), read-only-memories (ROMS), volatile memories, non-volatile memories, and other semiconductor memories. In various embodiments, memory subsystem 1615 can include Approval Workflow Framework for Services Procurement data and program code 1640.

Storage subsystem 1620 can include hardware and/or software elements configured for storing information. Storage subsystem 1620 may store information using machine-readable articles, information storage devices, or computer-readable storage media. Storage subsystem 1620 may store information using storage media 1645. Some examples of storage media 1645 used by storage subsystem 1620 can include floppy disks, hard disks, optical storage media such as CD-ROMS, DVDs and bar codes, removable storage devices, networked storage devices, or the like. In some embodiments, all or part of Approval Workflow Framework for Services Procurement data and program code 1640 may be stored using storage subsystem 1620.

In various embodiments, computer system 1600 may include one or more hypervisors or operating systems, such as WINDOWS, WINDOWS NT, WINDOWS XP, VISTA, or the like from Microsoft of Redmond, Wash., SOLARIS from Sun Microsystems, LINUX, UNIX, and UNIX-based operating system. Computer system 1600 may also include one or more applications configured to execute, perform, or otherwise implement techniques disclosed herein. These applications may be embodied as Approval Workflow Framework for Services Procurement data and program code 1640. Additionally, computer programs, executable computer code, human-readable source code, engines, or the like, and data, such as files, models, descriptions of objects, procedural descriptions, descriptor files, or the like, may be stored in memory subsystem 1615 and/or storage subsystem 1620.

The one or more input/output (I/O) interfaces 1625 can include hardware and/or software elements configured for performing I/O operations. One or more input devices 1650 and/or one or more output devices 1655 may be communicatively coupled to the one or more I/O interfaces 1625.

The one or more input devices 1650 can include hardware and/or software elements configured for receiving information from one or more sources for computer system 1600. Some examples of the one or more input devices 1650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1650 may allow a user of computer system 1600 to interact with one or more non-graphical or graphical user interfaces to enter a comment, select objects, icons, text, user interface widgets, or other user interface elements that appear on a monitor/display device via a command, a click of a button, or the like.

The one or more output devices 1655 can include hardware and/or software elements configured for outputting information to one or more destinations for computer system 1600. Some examples of the one or more output devices 1655 can include a printer, a fax, a feedback device for a mouse or joystick, external storage systems, a monitor or other display device, a communications interface appropriately configured as a transceiver, or the like. The one or more output devices 1655 may allow a user of computer system 1600 to view objects, icons, text, user interface widgets, or other user interface elements.

A display device or monitor may be used with computer system 1600 and can include hardware and/or software elements configured for displaying information. Some examples include familiar display devices, such as a television monitor, a cathode ray tube (CRT), a liquid crystal display (LCD), or the like.

Communications interface 1630 can include hardware and/or software elements configured for performing communications operations, including sending and receiving data. Some examples of communications interface 1630 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1630 may be coupled to communications network/external bus 1660, such as a computer network, to a FireWire bus, a USB hub, or the like. In other embodiments, communications interface 1630 may be physically integrated as hardware on a motherboard or daughter board of computer system 1600, may be implemented as a software program, or the like, or may be implemented as a combination thereof.

In various embodiments, computer system 1600 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1600.

As suggested, FIG. 16 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method of approving timesheets using an approval workflow engine, the method comprising:

generating, with one or more processors associated with one or more computer systems, information configured to display a user interface with at least one or more input fields associated with one or more stages for workflows for processing timesheets, one or more input fields associated with one or more paths in each of the one or more stages, and one or more input fields for each step of each path in each of the one or more stages;

receiving, at the one or more computer systems, information via the user interface specifying a set of timesheet approval rules for at least one path of at least one stage of a workflow for processing timesheets, each timesheet approval rule in the set of timesheet approval rules identifying one or more timesheet attributes and specifying one or more conditions that need to be satisfied by timesheet information for the timesheet approval rule to apply to a timesheet represented by the timesheet information;

storing the set of timesheet approval rules in a database associated with the one or more computer systems;

receiving, at the one or more computer systems, information representing a timesheet, wherein the information representing the timesheet includes a plurality of timesheet attributes and corresponding attribute values;

applying, with one or more processors associated with the one or more computer systems, one or more timesheet approval rules in the set of stored timesheet approval rules to the information representing the timesheet to determine whether the one or more timesheet approval rules are satisfied by the corresponding attribute values of the plurality of timesheet attributes; and generating, with the one or more processors associated with the one or more computer systems, one or more approval notifications to one or more approvers or reviewers based on application of the timesheet approval rules.

2. The method of claim 1, further comprising receiving, at the one or more computer systems, information indicative of an approval, disapproval, or push back from each of the one or more approvers or reviewers.

3. The method of claim 1, further comprising receiving, at the one or more computer systems, a hold indication for all or a portion of the information representing the timesheet from a current approver in a sequence of approvers.

4. The method of claim 3, further comprising generating, with the one or more processors associated with the one or more computer systems, one or more notifications indicative of a reason for the hold to an approver or reviewer based on a designated approver or reviewer established in a routing setup.

5. The method of claim 4, further comprising modifying, with the one or more processors associated with the one or more computer systems, the information representing the timesheet based on information submitted by an approver relative to the current approver in the sequence of approvers.

6. The method of claim 5, further comprising re-applying, with the one or more processors associated with the one or more computer systems, the one or more timesheet approval rules in response to a modification of the information representing the timesheet.

7. The method of claim 1, wherein receiving, at the one or more computer systems, the information representing the timesheet comprises receiving one or more line items and header information.

8. The method of claim 1, further comprising transmitting, using the one or more computer systems, the one or more notifications to the one or more approvers or reviewers via email.

9. The method of claim 1, further comprising:
providing, using the one or more computer systems, an approval interface to the approvers or reviewers; and
providing, using the one or more computer systems, a display of timesheets needing approval in a consolidated view.

10. The non-transitory computer-readable medium of claim 1, further comprising:
code for providing an approval interface to the approvers or reviewers; and
code for providing a display of timesheets needing approval in a consolidated view.

11. A method of approving progress logs using an approval workflow engine, the method comprising:
generating, with one or more processors associated with one or more computer systems, information configured to display a user interface with at least one or more input fields associated with one or more stages for workflows for processing progress logs, one or more input fields associated with one or more paths in each of the one or more stages, and one or more input fields for each step of each path in each of the one or more stages;

receiving, at the one or more computer systems, information via the user interface specifying a set of progress log approval rules for at least one path of at least one stage of a workflow for processing progress logs, each progress log approval rule in the set of progress log approval rules identifying one or more progress log attributes and specifying one or more conditions that need to be satisfied by progress log information for the progress log approval rule to apply to a progress log represented by the progress log information;

storing the set of progress log approval rules in a database associated with the one or more computer systems;

receiving, at the one or more computer systems, information representing a progress log, wherein the information representing the progress log includes a plurality of progress log attributes and corresponding attribute values;

applying, with one or more processors associated with the one or more computer systems, one or more progress log approval rules in the set of stored progress log approval rules to the information representing the progress log to determine whether the one or more progress log approval rules are satisfied by the corresponding attribute values of the plurality of progress log attributes; and generating, with the one or more processors associated with the one or more computer systems, one or more approval notifications to one or more approvers or reviewers based on application of the progress log approval rules.

12. A method of approving expense approvals using a workflow engine, the method comprising:
generating, with one or more processors associated with one or more computer systems, information configured to display a user interface with at least one or more input fields associated with one or more stages for workflows for processing expense approvals, one or more input fields associated with one or more paths in each of the one or more stages, and one or more input fields for each step of each path in each of the one or more stages;

receiving, at the one or more computer systems, information via the user interface specifying a set of expense approval rules for at least one path of at least one stage of a workflow for processing expense approvals, each expense approval rule in the set of expense approval rules identifying one or more expense attributes and specifying one or more conditions that need to be satisfied by expense information for the expense approval rule to apply to an expense represented by the expense information;

storing the set of expense approval rules in a database associated with the one or more computer systems;

receiving, at the one or more computer systems, information representing an expense, wherein the information representing the expense includes a plurality of expense attributes and corresponding attribute values;

applying, with one or more processors associated with the one or more computer systems, one or more expense approval rules in the set of stored expense approval rules to the information representing the expense to determine whether the one or more expense approval rules are satisfied by the corresponding attribute values of the plurality of expense attributes; and generating, with the one or more processors associated with the one or more computer systems, one or more approval notifications to one or more approvers or reviewers based on application of the expense approval rules.

13. A non-transitory computer-readable medium storing code executable by a processor of a computer system for approving timesheets using an approval workflow engine, the non-transitory computer-readable medium comprising:

code for generating information configured to display a user interface with at least one or more input fields associated with one or more stages for workflows for processing timesheets, one or more input fields associated with one or more paths in each of the one or more stages, and one or more input fields for each step of each path in each of the one or more stages;

code for receiving information via the user interface specifying a set of timesheet approval rules for at least one path of at least one stage of a workflow for processing timesheets, each timesheet approval rule in the set of timesheet approval rules identifying one or more timesheet attributes and specifying one or more conditions that need to be satisfied by timesheet information for the timesheet approval rule to apply to a timesheet represented by the timesheet information;

code for storing the set of timesheet approval rules in a database;

code for receiving information representing a timesheet, wherein the information representing the timesheet includes a plurality of timesheet attributes and corresponding attribute values;

code for applying one or more timesheet approval rules in the set of stored timesheet approval rules to the information representing the timesheet to determine whether the one or more timesheet approval rules are satisfied by the corresponding attribute values of the plurality of timesheet attributes; and code for generating one or more approval notifications to one or more approvers or reviewers based on application of the timesheet approval rules.

14. The non-transitory computer-readable medium of claim 13, further comprising code for receiving information indicative of an approval, disapproval, or push back from each of the one or more approvers or reviewers.

15. The non-transitory computer-readable medium of claim 13, further comprising code for receiving a hold indication for all or a portion of the information representing the timesheet from a current approver in a sequence of approvers.

16. The non-transitory computer-readable medium of claim 15, further comprising code for generating one or more notifications indicative of a reason for the hold to an approver or reviewer based on a designated approver or reviewer established in a routing setup.

17. The non-transitory computer-readable medium of claim 16, further comprising code for modifying the information representing the timesheet based on information submitted by an approver relative to the current approver in the sequence of approvers.

18. The non-transitory computer-readable medium of claim 17, further comprising code for re-applying the one or more timesheet approval rules in response to a modification of the information representing the timesheet.

19. The non-transitory computer-readable medium of claim 13, wherein the code for receiving the information representing the timesheet comprises code for receiving one or more line items and header information.

20. The non-transitory computer-readable medium of claim 13, further comprising code for transmitting the one or more notifications to the one or more approvers or reviewers via email.

* * * * *

UNITED STATES PATENT AND TRADEMARK OFFICE
CERTIFICATE OF CORRECTION

PATENT NO. : 8,412,599 B2
APPLICATION NO. : 12/872253
DATED : April 2, 2013
INVENTOR(S) : Saiu et al.

It is certified that error appears in the above-identified patent and that said Letters Patent is hereby corrected as shown below:

In the Specifications:

In column 13, line 35, delete "denying. a" and insert -- denying. A --, therefor.

In the Claims:

In column 24, line 7-8, in Claim 10, delete "The non-transitory computer-readable medium of claim 1," and insert -- The method of claim 1, --, therefor.

Signed and Sealed this
Ninth Day of July, 2013

Teresa Stanek Rea
*Acting Director of the United States Patent and Trademark Office*